Oct. 19, 1954   W. HONEGGER   2,691,965
PISTON EXPANSION ENGINE
Filed Sept. 24, 1952   5 Sheets-Sheet 1

Fig. 1

Oct. 19, 1954     W. HONEGGER     2,691,965

PISTON EXPANSION ENGINE

Filed Sept. 24, 1952     5 Sheets-Sheet 3

Inventor
Willy Honegger
By
Singer Stern & Carlberg
attys.

Oct. 19, 1954   W. HONEGGER   2,691,965
PISTON EXPANSION ENGINE
Filed Sept. 24, 1952   5 Sheets-Sheet 5

Inventor
Willy Honegger
By
Singer Stern & Carlberg
attys

Patented Oct. 19, 1954

2,691,965

UNITED STATES PATENT OFFICE 2,691,965

PISTON EXPANSION ENGINE

Willy Honegger, Zurich, Switzerland

Application September 24, 1952, Serial No. 311,188

Claims priority, application Switzerland
September 30, 1951

22 Claims. (Cl. 121—124)

This invention relates to piston expansion engines.

With piston expansion engines, a gaseous medium under pressure such as superheated steam, compressed air or a compressed gas to be liquefied is let in a predetermined quantity into the compression chamber of a cylinder through an inlet valve, whereafter the said inlet valve is closed so that the medium enclosed can expand and thereby transmit the work of expansion on to the piston. After the expansion has reached a predetermined lower value of pressure, the exhaust valve is opened and the medium is exhausted into the exhaust conduit by the piston returning into its inner dead center position. Such engines can either be used for mechanically utilizing the energy contained in a compressed gas, or for lowering the temperature of a medium through the adiabatic expansion taking place and thereby producing cold.

It is a main object of the invention to provide a piston expansion engine in which, by timing the control of the valves, the moments when these valves are to be opened and/or closed are determined accurately.

It is another object of the invention to provide a piston expansion engine in which the valves, in the open state, offer practically no resistance to the medium flowing through them.

It is a further object of the invention to provide a piston expansion engine in which the time required for making the transition from the closed to the open position of the valves and vice versa is as short as possible.

These objects have been known per se, but it has been found very difficult to find a technical solution for attaining them in a manner free from objection, for example the poppet valves, slide valves etc. hitherto used did not allow achievement of the desired short time operation.

With these and other objects in view I provide a method of operating a piston expansion engine comprising the steps of pre-stressing, during predetermined phases of motion of the piston, parts of at least one valve, and of performing, in a subsequent predetermined phase position of the piston, the movement of the valve prepared by the said pre-stressing under the action of an additional releasing impulse.

I preferably use a direct mechanical action of the motion of the piston on a spring loaded biassing control means for preparing the movement of the valve, the direct action of the piston on such control means being essential in that the control does not then act on a detour via cam shafts and the like but directly across the cylinder space.

I also preferably use pre-stressed spring means to act on the inlet valve during the stroke of the piston towards its inner dead center position by mechanical action in such a manner that they tend per se to open the valve, without however being capable of overriding the pneumatic closing pressure acting on the valve from the compression chamber, whereafter, through mechanical action of the said piston in the inner dead center position thereof the valve is lifted off its seat so that the pre-stressed spring means may effect an accelerated opening of the valve.

The term "dead center position" as used hereinabove is to be construed in its practice meaning and comprises also those positions of the piston in which the same is at a short distance from the theoretical dead center positions.

It is also advantageous to have the exhaust valve, too, closed by direct mechanical action of the piston, approximately in the inner dead center position of the latter. When closing the exhaust valve, I preferably use pre-stressed spring means to act on the same so that they tend to re-open the exhaust valve, their spring forces being, however, so dimensioned that they are capable of opening the exhaust valve at an accelerated rate only when the internal pressure counteracting such opening has dropped below a predetermined magnitude.

Further, I provide according to the invention a piston expansion engine operating according to the method set forth hereinabove and comprising in combination: a piston, an inlet valve, an exhaust valve, control means for at least one of the said valves in direct mechanical cooperation with the said piston and pre-stressed by the latter during predetermined phases of motion thereof, and under the action of an additional releasing impulse in a predetermined phase of motion thereof performing suddenly the movement of the valve prepared by the pre-stressing.

Further objects and features of the invention will be apparent from the description of some embodiments thereof which will now be given by way of example with reference to the accompanying drawings which illustrate also the method according to the invention, and while I am describing and illustrating what may be considered as typical and particularly useful examples I wish to be understood that I do not limit myself to the particular details and dimensions described and illustrated, for obvious modifications will occur to a person skilled in the art.

Figure 1:
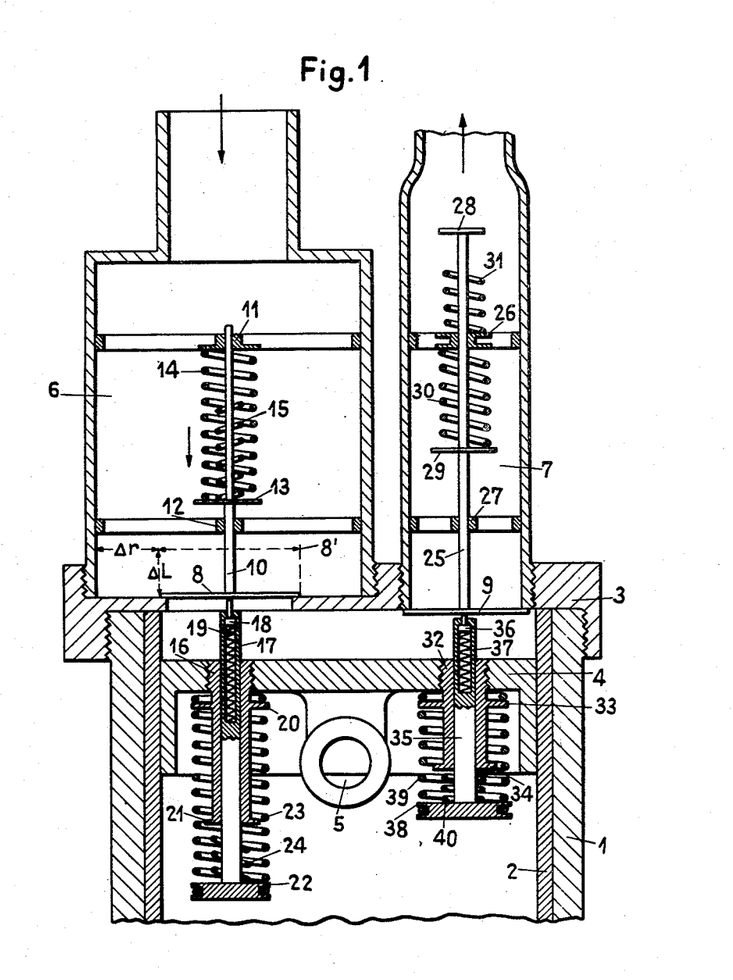
Fig. 1 shows in longitudinal section a cylinder with piston operated valves of a piston expansion engine according to the invention.

According to Fig. 1, a liner 2 is inserted into a cylinder 1 in the usual manner. This cylinder 1 is covered by a cylinder head 3 which is screwed on and which serves for the accommodation of the valves. A piston 4 having a gudgeon pin bearing 5 is slidably mounted in a cylinder 1. An inlet conduit 6 is in communication with a container of compressed air or gas (not shown) while an exhaust conduit 7 leads either into the open atmosphere or is in communication with a low pressure container (not shown).

An inlet valve 8 as well as an exhaust valve 9 are constructed of plates of spring steel, which provides the advantage of combining comparatively wide apertures with small inertia masses to be moved.

The inlet valve opens towards the interior of the inlet conduit 6, i. e. outwardly in relation to the cylinder space, so that in the open position 8' as indicated in dotted lines an annular aperture of the width $\Delta r$ and the height $\Delta h$ is left clear.

The exhaust valve 9 opens towards the cylinder space so that a comparatively large opening is formed thereby. An axial carrier spindle 10 of the inlet valve is guided in axial guide bearings 11 and 12. A flange 13 on the spindle 10 is abutted by one end of a closing spring 14 for the valve, the other end of which abuts on the guide bearing 11. In the interior of the said compression spring 14 a further spring 15 is inserted which has the object of buffering the kinetic energy of the moving mass when the valve opens.

A carrier bushing 16 is screwed in the bottom of the piston 4, in which a control rod 17 in the form of a small tube is axially movable. This small tube 17 has at its front end a striker pin 18 which by means of the spring 19 abuts against the control rod 17. The carrier bushing 16 is provided with two spring flanges 20 and 21. At the lower end of the control rod 17, a flange 22 is provided so that a tension spring 23 can be suspended between the flange 20 and the flange 22. This tension spring serves as a supporting spring for the control rod 17 in the piston 4. A further spring 24 lies between the flanges 22 and 21 and serves for buffering the kinetic energy of the control rod 17.

A carrier spindle 25 for the exhaust valve 9 is axially guided in the exhaust conduit 7 by means of the guide bearings 26 and 27. The spindle 25 is provided with two flanges 28 and 29, and a compression spring 30 is interposed between the bearing 26 and the flange 29 which tends to open the valve 9. A buffer spring 31 is interposed between the flange 28 and the bearing 26 and serves for buffering the kinetic energy of the spindle 25. A carrier bushing 32 is screwed in the bottom of the piston 4 which is provided with flanges 33 and 34. A control rod 35 in the form of a small tube is axially shiftable in the interior of this bushing. The head of this small tube contains a striker pin 36 which by means of the compression spring 37 abuts against the small tube 35. A spring holder flange 38 on the tube 35 serves for supporting a holder spring 39 constructed as a tension spring between the flanges 33 and 38. A buffer spring 40 is effective between the flanges 38 and 34 and serves for buffering the kinetic energy of motion of the control rod 35.

The manner of operation of the arrangement illustrated in Fig. 1 will now be explained with reference to Figs. 2 to 9.

Figure 2:
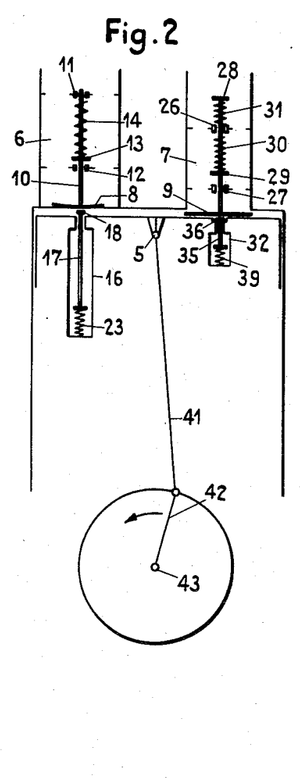
Figs. 2 to 9 show diagrammatically the components represented in Fig. 1 in various operational phases and positions.

According to Fig. 2, the piston 4 which is articulated by means of a connecting rod 41 on a crank 42 of a crank shaft 43 is indicated as approaching the inner dead center position. The striker pin 36 of the control rod 35 then abuts on the underside of the exhaust valve 9 in order to close the same. In the meantime the striker pin 18 of the control rod 17 has been abutting on the inlet valve 8 so that the spring 23 has been pre-stressed, which is illustrated in a simplified manner as a compression spring. The valve 8, however, remains closed for the time being, because the loaded spring 23 in this condition is not yet capable of overcoming the excess pressure prevailing in the valve chamber 6.

Figure 3:
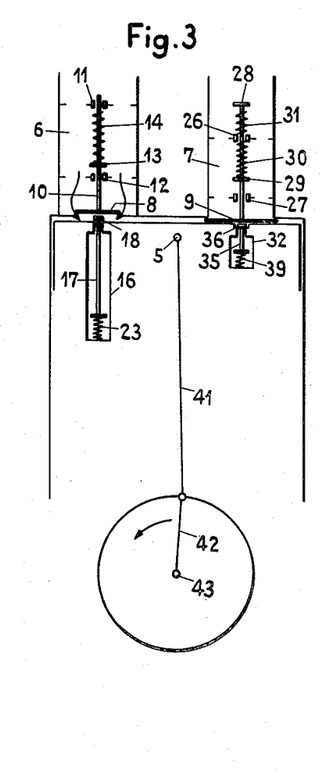

According to Fig. 3, the piston has practically reached its inner dead center position so that now the exhaust valve 9 has been completely closed by the striker pin 36. At the same time, the inlet valve 8, too, is now lifted by the control rod 17 so that equalization of pressure is now established between the space 6 and the cylinder space. Accordingly the spring 23 can expand, and the control rod 17 effects an accelerated opening movement of the inlet valve 8, the closing spring 14 of the valve being loaded at the same time.

Figure 4:
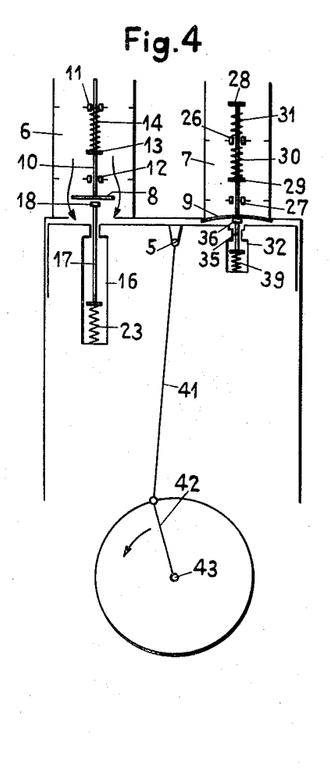

On the other hand the compressed air, flowing in, produces a load on the exhaust valve from the side of the cylinder space so that this exhaust valve is now kept forcibly closed. This position is represented in Fig. 4. The complete closing of the exhaust valve and the complete opening of the inlet valve is thus attained in a very short time.

Figure 5:
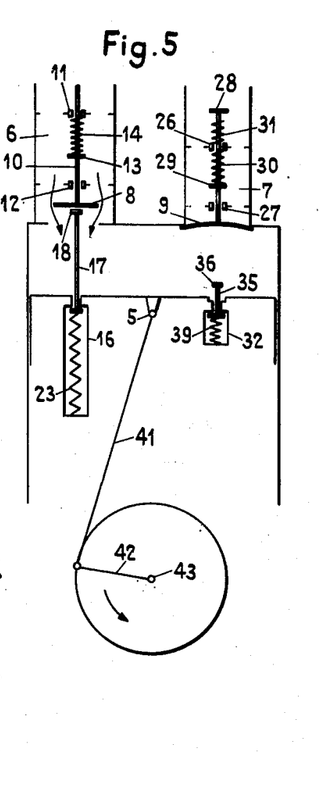
Figure 6:
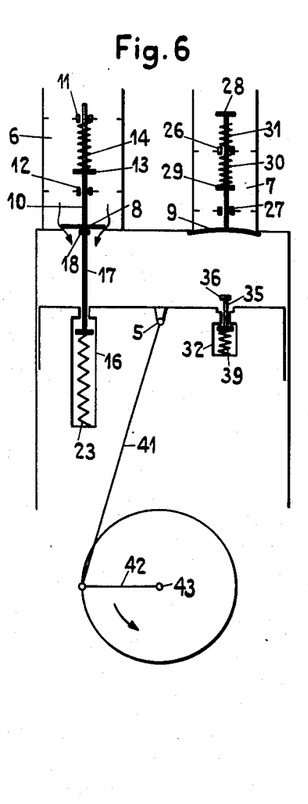

In a predetermined phase of the motion of the piston, as illustrated in Fig. 5, towards its outer dead center position, the striker pin 18 of the control rod 17 disengages the underside of the inlet valve 8 so that said inlet valve starts closing under the action of the loaded closing spring 14. Inherently, this closing movement could not take place more quickly than the speed determined by the piston velocity in this phase. However, as illustrated in Fig. 6, increased restriction of the inlet aperture increases the pressure drop between the chamber 6 and the cylinder space. This pressure drop acts in the sense of further acceleration of the closing movement, whereafter the supporting spring 23 is again slightly loaded. In this manner a predetermined phase of motion of the piston on its way towards its outer dead center position permits the valve 8 to be closed in the shortest time. From this moment onward, the pressure medium enclosed in the cylinder space can expand adiabatically and transmit the corresponding amount of work to the piston.

Figure 7:
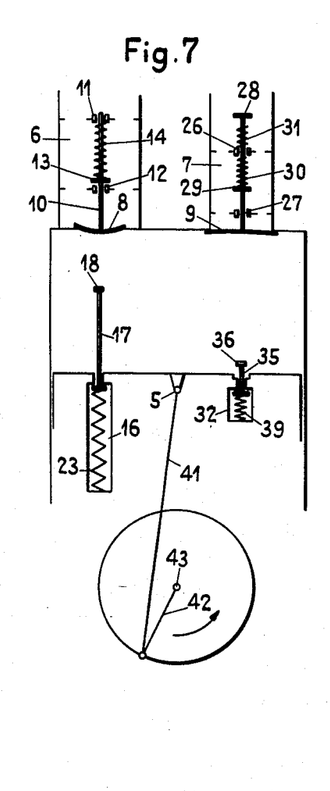
Figure 8:
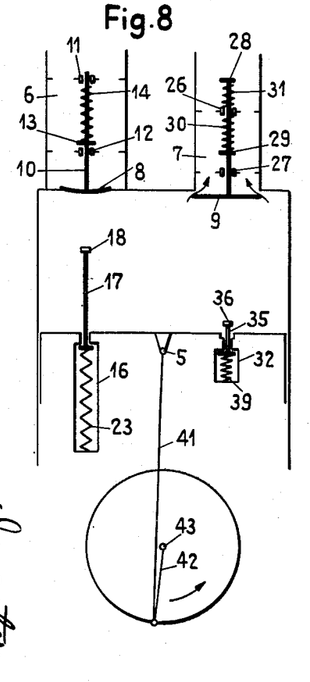
Figure 9:
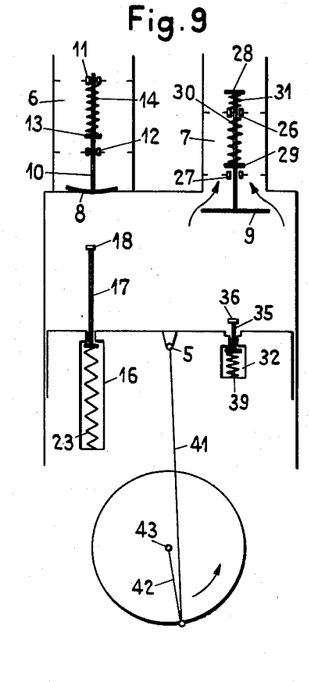

In Fig. 7 it is shown that even shortly before reaching the outer dead center position, the conditions are substantially unchanged, i. e. the inlet valve 8 is kept closed under the combined action of the excess pressure prevailing and of the force of the closing spring of the valve, while the outlet valve 9 is still kept closed by the force of the internal pressure overriding the opening force of the spring 30. Only when the outer dead center position is almost reached as shown in Fig. 8, does the internal pressure drop sufficiently so that the opening spring 30 is capable of opening the exhaust valve 9. At the moment when complete equalization of pressure is established between the space 7 and the cylinder space, the opening of the exhaust valve is quickly accelerated. The opening force of the spring 30 acts on said valve so that for a few angular degrees after having passed the outer dead center position the exhaust valve 9 is completely opened, as illustrated in Fig. 9. This valve 9 then remains open until the piston has regained the position illustrated in Fig. 2.

It is possible without difficulty to adjust the length of the control rods and of the spindles carrying the valves as well as to adjust the characteristics of the springs in such a manner that in a predetermined phase of motion of the piston on its path from the inner to its outer dead center position the mechanical action of the piston on the inlet valve ceases, the valve being closed at an increasing rate under the accelerating action of the closing spring of this valve as well as by the action of the pressure drop set up.

While according to this embodiment the opening of the exhaust valve 9 is effected when the internal pressure in the cylinder drops below a predetermined limit, it would alternatively be possible to house a control rod in the piston 4 which would also be connected to the valve 9 so that in the outer dead center position this control rod would open the valve 9 by mechanical action.

While in the embodiments illustrated the control rods 17 and 35, respectively, are housed and supported in the piston 4, it is likewise possible to attain the direct mechanical action of this piston on the valves from outside of the cylinder space by having a control rod projecting from the valve into the cylinder space. Such an embodiment of an inlet valve is illustrated in Fig. 10.

Figure 10:
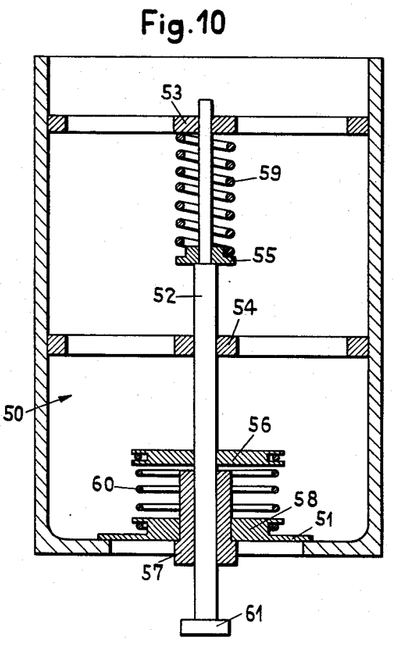
Fig. 10 shows semi-diagrammatically a different embodiment of inlet valve.

According to Fig. 10, the passage of an inlet conduit 50 into the cylinder space can be obturated by a plate 51 of spring steel. A control rod 52 is axially guided in guide bearings 53 and 54. This control rod has two spring holder flanges 55 and 56. A slide bushing 57 serves as a carrier for the spring steel plate 51 and is capable of reciprocating on the lower portion of the control rod 52 between the flange 56 and head 61 thereof. A spring holder flange 58 is attached to the slide bushing 57. A compression spring 59 for closing the valve tends to hold the control rod 52 in the lower position referred to, while a tension spring 60, which is suspended between the flanges 56 and 58, tends to pull the bush 57 towards the flange 56. The manner of operation of this arrangement is as follows:

When the piston abuts the head 61 of the control rod 52 from below, said rod is raised against the action of the compression spring 59. However, since the excess pressure existing in the space 50 keeps the valve plate 51 closed, the tension spring 60 remains loaded until the valve plate 51 is lifted by the head 61 when the piston is in the inner dead center position. At this moment equalization of pressure between the cylinder space and the space 50 is effected so that the pre-stressed tension spring 60 simultaneously pulls the slide bushing and the valve plate 51 upwardly at an accelerated rate. During the downward movement of the piston the head 61 of the control rod 62 follows up the piston under the action of the compression spring 59 so that the valve is closed in a predetermined phase of motion of the piston. The tension spring 60 has accordingly the same function as the tension spring 23 in Fig. 1.

Figure 11:
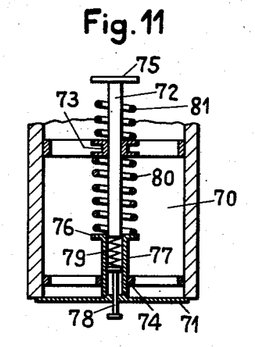
Fig. 11 shows semi-diagrammatically a different embodiment of exhaust valve.

In Fig. 11 an exhaust valve is illustrated, in connection with which no control rod on the piston is required. A control rod 72, which at the same time serves as a carrier spindle for a valve plate 71, is axially guided by guide bearings 73 and 74 in an exhaust conduit 70, said conduit being closed off from a cylinder space by said plate 71. The control rod 72 has two spring holder flanges 75 and 76, and has a control sleeve 77 mounted on the lower end thereof from which projects a control pin 78. A spring 79 in the sleeve 77 abuts adjacent ends of the control rod 72 and the control pin 78. A compression spring 80 interposed between the bearing 73 and the flange 76 tends to open the valve. A buffer spring 81 is provided to cushion the kinetic energy of the moving masses when the valve is being opened. The function of such an exhaust valve is easily understood, the spring 79 having substantially the same function as the spring 39 in Fig. 1.

Figure 12:
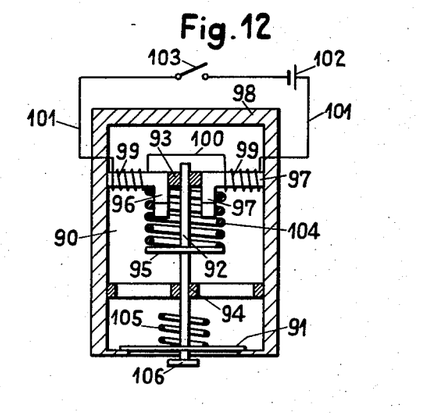
Fig. 12 shows an inlet valve with an electromagnetic valve holding device.

In Fig. 12 another embodiment is diagrammatically represented which shows how the length of travel of the control members can be limited. Although the opening of the inlet valve is initiated by direct mechanical control action of the piston, the holding and re-closing of the inlet valve is effected by the use of an electromagnetic holding device. For this purpose, a carrier spindle 92 for an inlet valve 91 is guided in an inlet conduit 90 by means of axial guide bearings 93 and 94. An iron armature 95 is fixedly mounted on the carrier spindle 92 and cooperates with the magnet poles 96 of an electromagnet 97. The upper portion of an electromagnet bridging yoke 98 is formed by the cover of the inlet conduit 90, and closes the magnetic flux of said magnet 97. The magnet has coils 99 having electric supply connection lines 100 and 101. A battery 102 may be arranged anywhere on the engine. A usually closed control switch 103 is opened temporarily during predetermined phases of motion of the piston, namely when the inlet valve is to be closed. The duration as well as the timing of this opening of the switch 103 is controlled by means known per se, such as cam operated switches, from the crank shaft. A closing spring 104 is located between the magnet 97 and the armature 95, while a buffer spring 105 is provided for cushioning the impact of the valve opening action. The manner of operation of this arrangement is as follows:

Although the circuit of the electromagnet 97 is closed in the phase illustrated, the magnetic force generated is not capable of attracting the armature 95 because the valve plate 91 is loaded by the excess pressure in the inlet conduit 90. However, as soon as the valve plate 91 is slightly lifted off its seat by means of a short control rod 106 which is mounted on the piston or as shown on the valve plate 91, equalization of pressure is established. This enables the armature 95 to be pulled upwardly by the poles 96 of the electromagnet 97 at the same time permitting the compression spring 104 to be loaded. During a predetermined phase of motion of the piston the switch 103 is opened for a short while permitting the loaded compression spring 104 to restore the spindle 92 and the valve 91 to the closed position.

Figure 13:
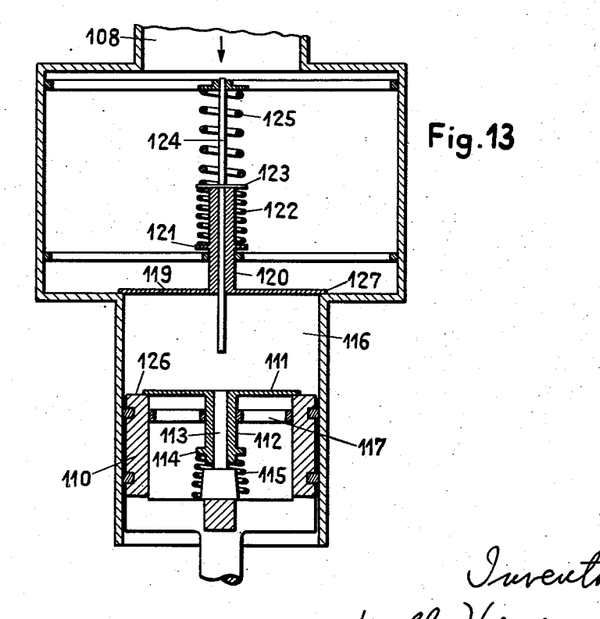
Fig. 13 shows a modification of a piston expansion engine according to the invention in an axial part section through the cylinder.

Fig. 13 shows diagrammatically a modification of the expansion piston engine according to the invention having an exhaust valve 111 housed in a piston 110, said valve being shiftably guided by a sleeve 112 on a pin 113 fixedly arranged on the piston 110. The sleeve 112 has a flange 114 against which abuts a compression spring 115 tending to lift the valve 111. However, during the outward motion of the piston the valve 111 remains in the position illustrated under the action of the pressure in the cylinder space 116. Radial bars 117 serve for limiting the stroke of the valve sleeve 112. An inlet conduit 108 is attached to the cylinder head. The inlet valve 119 extends over the full diameter of the cylinder and carries a sleeve 120 in turn having a flange 121 thereon. The flange 121 is connected to one end of a tension spring 122 the other end of which is attached to an annular flange 123 of a rod 124. A compression spring 125 tends to press the annular flange 123 against the upper end of the sleeve 120.

The manner of operation is as follows: During the upward stroke of the piston the exhaust valve 111 is in the position illustrated and referred to and opens under the action of the spring 115 as soon as the pressure has dropped to a predetermined value. In the raised position of the valve 111 the piston moves downwardly and towards the end of its stroke, the pin 113 contacts the rod 124. The valve 111 is thereby forced downwardly against the action of the spring 115 to a closed position. The upward movement of the rod 124 loads both of the springs 122 and 125.

The opening of the inlet valve 119 is effected positively by the piston, the bottom 126 of which reaches, in the upper dead center position, a point above the valve seating position 127.

What I claim as my invention and desire to secure by Letters Patent, is:

1. A piston expansion engine, comprising in combination: a cylinder, a piston reciprocating in the said cylinder, a cylinder head defining a cylinder space in the said cylinder between itself and the said piston, an inlet valve and an exhaust valve arranged on the said cylinder space, and resilient control means for each of the said valves in operative relationship to the said piston, the said resilient control means being loaded by the said piston during a predetermined phase of motion of the latter, and being triggered off by an additional releasing impulse whereby the respective valve controlled by its associated resilient control means is accelerated to a predetermined movement controlling the inlet to and exhaust from the said cylinder, respectively.

2. A piston expansion engine comprising in combination: a cylinder, a piston reciprocating in the said cylinder, a cylinder head defining a cylinder space in the said cylinder between itself and the said piston, an inlet valve and an exhaust valve arranged on the said cylinder space controlling the inlet into and the exhaust from the said cylinder space, respectively, spring biased control rods each in positive operational relation to one of the said valves and directly mechanically operated by the said piston, the said control rods each preparing the movement of its associated valve during a predetermined phase of motion of the said piston, the actual movement of the said valve being triggered off by an additional releasing impulse.

3. A piston expansion engine comprising in combination: a cylinder, a piston reciprocating in the said cylinder, a cylinder head defining a cylinder space in the said cylinder between itself and the said piston, an inlet valve and an exhaust valve arranged on the said cylinder space and respectively controlling the inlet into and the exhaust from the same, resilient means acting on the said inlet valve and being loaded by mechanical action of the said piston on its motion towards its inner dead center position to such an extent as to tend to open the said inlet valve, the excess pressure from outside which acts on the said inlet valve in the sense of closing the same overriding the action of the said resilient means, the said piston in its inner dead center position lifting the said valve by direct mechanical action, whereby equalization of pressure on both sides of the said valve is established, the said loaded resilient means then opening the said valve at an accelerated rate.

4. A piston expansion engine as claimed in claim 3 wherein the said piston ceases to act on the said valve in a predetermined phase of the piston motion whereby the said valve is closed by the said excess pressure and whereby the total opening period of the said valve is determined.

5. A piston expansion engine comprising in combination: a cylinder, a piston reciprocating in the said cylinder, a cylinder head defining a cylinder space in the said cylinder between itself and the said piston, an inlet valve and an exhaust valve arranged on the said cylinder space and respectively controlling the inlet into and exhaust from the same, resilient means acting on the said inlet valve and being loaded by mechanical action of the said piston during the stroke of the latter towards the inner dead center position to such an extent as to tend to open the said valve, the excess pressure from outside which acts on the said inlet valve in the sense of closing the same overriding the action of the said resilient means, the said exhaust valve being closed before the said piston reaches its inner dead center position whereby the pressure in the said cylinder space is increased upon the said piston approaching its inner dead center position, the said inlet valve is lifted off its seat by the said resilient means and equalization of pressure on both sides of the said inlet valve is established, whereby the said inlet valve is opened by the said resilient means at an accelerated rate.

6. A piston expansion engine as claimed in claim 5 wherein the said exhaust valve is in direct mechanical cooperation with the said piston, and is positively closed by the latter upon its substantially reaching its inner dead center position.

7. A piston expansion engine as claimed in claim 6, comprising in addition: resilient means associated with and tending to open the said exhaust valve upon being loaded by the said piston, positively opening the said valve, the excess pressure inside the said cylinder space overriding the said resilient means until by the outward stroke of the said piston the pressure inside the said cylinder space has dropped to a predetermined value.

8. A piston expansion engine as claimed in claim 6 comprising in addition: control means operatively associated both with the said piston and with the said exhaust valve in the sense of directly mechanically opening the said exhaust valve by the said piston at a predetermined position of the latter.

9. A piston expansion engine comprising in combination: a cylinder, a piston reciprocating in the said cylinder, a cylinder head defining a cylinder space in the said cylinder between itself and the said piston, an inlet valve and an exhaust valve arranged on the said cylinder space, respectively controlling the inlet into and the exhaust from the same, a spring operatively associated with one of the said valves and temporarily prestressed by mechanical action of the said piston, a control rod arranged between the said piston and the said valve resiliently supported on at least one of these two, the said control rod transmitting during predetermined phases of motion of the piston the said motion on to the said spring in the sense of prestressing the same, the actual movement of the said valve by the said spring being triggered off by an additional releasing impulse.

10. A piston expansion engine comprising in combination: a cylinder, a piston reciprocating in the said cylinder, a cylinder head defining a cylinder space in the said cylinder between itself and the said piston, an inlet valve and an exhaust valve arranged on the said cylinder space, respectively controlling the inlet into and the exhaust from the same, a control rod arranged between at least one of the said valves and the said piston resiliently housed in at least one of these two and positively operating its associated valve at a predetermined phase of motion of the said piston.

11. A piston expansion engine as claimed in claim 10 wherein the said control rod is mounted axially shiftable in the bottom of the said piston, and comprising in addition: a spring supporting the said rod against the said piston, the end of the said rod projecting beyond the said piston towards the center of its associated valve.

12. A piston expansion engine as claimed in claim 10 wherein the said control rod is mounted axially shiftable in the said cylinder head, and comprising in addition: a spring supporting the said rod against the said cylinder head, the end of the said rod projecting into the cylinder space towards the said piston.

13. A piston expansion engine as claimed in claim 12 wherein the said exhaust valve upon being opened moves into the said cylinder space.

14. A piston expansion engine as claimed in claim 12 wherein the said exhaust valve consists of a spring steel plate, and comprising in combination: an exhaust conduit, a spindle carrying the said exhaust valve plate and mounted axially shiftable in the said exhaust conduit, a flange arranged on the said spindle, two compression springs abutting on the said flange from opposite sides, one of the said compression springs tending to open the said valve and the other compression spring resiliently limiting the opening stroke of the said valve.

15. A piston expansion engine as claimed in claim 12 comprising in addition an opening spring for the said exhaust valve which is so dimensioned that it is capable of opening the said valve when closed then only when the pressure prevailing in the said cylinder space has dropped below a predetermined limit.

16. A piston expansion engine as claimed in claim 12 comprising in addition: a control rod resiliently abutting both on the said piston and on the said exhaust valve and permanently coupling the said piston and exhaust valve with one another whereby the said exhaust valve is opened in a predetermined phase of the piston motion, and is closed in another predetermined phase thereof.

17. A piston expansion engine as claimed in claim 12 wherein the said inlet valve consists of a spring steel plate and comprising in addition: a compressed air container, a conduit connecting the said container to the said inlet valve, a spindle supporting the said inlet valve guided axially movable in the said conduit, a head arranged on the said spindle projecting into the said cylinder space, a sleeve shiftably mounted on the said spindle behind the said head, a tension spring in operative connection with the said valve plate tending to pull the same away from the said head, a compression spring in operative connection with the said spindle tending to push the same as a whole into the said cylinder space, the said piston in its motion towards its inner dead center position pushing the said spindle back against the force of the said compression spring and loading the said tension spring, the said sleeve carrying the said valve plate remaining stationary owing to the closing action of the excess pressure in the said container until in the said inner dead center position of the said piston the said valve plate is positively lifted by the said head, whereby owing to equalization of pressure between the said container and the said cylinder space the said inlet valve is completely opened by the said tension spring, and upon return of the said piston towards its outer dead center position is closed again by the action of the said compression spring in a predetermined position of the said piston.

18. A piston expansion engine comprising in combination: a cylinder, a piston reciprocating in the said cylinder, a cylinder head defining a cylinder space between itself and the said piston, a pressure container, a conduit connecting the said pressure container to the said cylinder head, an inlet valve consisting of a spring steel plate arranged between the said conduit and the said cylinder space, a spindle axially guided in the said conduit and carrying the said inlet valve, a spring tending to close the said inlet valve, an exhaust valve arranged on the said cylinder head, resilient control means for each of the said valves in operative relationship to the said piston, the said resilient control means being loaded by the said piston during a predetermined phase of motion of the latter and being triggered off by an additional releasing impulse whereby the respective valve associated to the said resilient means is accelerated to a predetermined movement controlling the inlet to and exhaust from the said cylinder space, respectively.

19. A piston expansion engine comprising in combination: a cylinder, a piston reciprocating in the said cylinder, a cylinder head defining a cylinder space between itself and the said piston in the said cylinder, an inlet valve and an exhaust valve each consisting of a spring steel plate and a sleeve supporting the same arranged on the said cylinder space and respectively controlling the inlet into and the exhaust from the same, a closing spring associated with the said inlet valve, a control rod movably housed in the said piston, a spring supporting the said rod against the said piston and of a characteristic enabling the said control rod to override the combined action of the excess pressure prevailing from outside on the said inlet valve in the sense of closing the same and of the closing spring associated with the said inlet valve in a predetermined end phase of the piston stroke towards the inner dead center position only whereby the said spring steel plate of the said inlet valve is lifted and the pressures on both sides of the said inlet valve are equalized and the spring action of the said supporting spring considerably overrides that of the said closing spring of the said inlet valve and throws the latter fully open at an accelerated rate.

20. A piston expansion engine as claimed in claim 19 wherein the lengths of the said spindle carrying the plate of the said inlet valve and of the said control rod, and the characteristics of the said supporting spring and of the said closing spring of the said inlet valve are so proportioned with respect to one another that in a predetermined phase of the motion of the said piston on its path from the inner to the outer dead center position the mechanical action of the piston on the said inlet valve ceases, and the said valve is then closed under the accelerating action of the said closing spring combined with the action of the pressure drop set up.

21. A piston expansion engine comprising in combination: a cylinder, a piston reciprocating in the said cylinder, a cylinder head defining a cylinder space in the said cylinder between itself and the said piston, an inlet valve and an exhaust valve arranged on the said cylinder space, resilient control means for each of the said valves in operative relationship to the said piston, and buffer springs, the said resilient control means being loaded by the said piston during a predetermined phase of motion of the latter and being triggered off by an additional releasing impulse whereby the respective valve controlled by its associated spring means is accelerated to a predetermined movement respectively controlling the inlet to and exhaust from the said cylinder space, the said buffer springs cushioning the kinetic energy of the said valves.

22. A piston expansion engine comprising in combination: a cylinder, a piston reciprocating in the said cylinder, a cylinder head defining in the said cylinder a cylinder space between itself and the said piston, an inlet valve and an exhaust valve arranged on the said cylinder space the said inlet valve consisting of a spring steel plate, a spindle carrying the said plate and projecting into the said cylinder space positively mechanically cooperating with the said piston upon the latter approaching its inner dead center position, a compression spring biassing the said plate into a closing position, an electromagnet in operative relation with and, when energized, tending to open the said valve, a source of electric current energizing the said electromagnet, and a switch operatively connected to, and working in synchronism with the motion of, the said piston, temporarily interrupting the said circuit.

References Cited in the file of this patent

UNITED STATES PATENTS

| Number | Name | Date |
|---|---|---|
| 625,792 | Naylor | May 30, 1899 |
| 707,452 | Schwend | Aug. 19, 1902 |
| 885,462 | Fletcher | Apr. 21, 1908 |
| 1,281,490 | Billado | Oct. 15, 1918 |
| 2,098,936 | Armstrong et al. | Nov. 16, 1937 |
| 2,408,075 | Kowalski, Jr. et al. | Sept. 24, 1946 |

FOREIGN PATENTS

| Number | Country | Date |
|---|---|---|
| 368,750 | France | Oct. 17, 1906 |